United States Patent [19]
Dohi et al.

[11] 4,403,058
[45] Sep. 6, 1983

[54] TWO-PART TYPE (METH)ACRYLATE ADHESIVES HAVING EXCELLENT STORAGE STABILITIES

[75] Inventors: Hidemi Dohi; Hideki Mori; Hideaki Matsuda, all of Kagawa, Japan

[73] Assignee: Okura Kogyo Kabushiki Kaisha, Japan

[21] Appl. No.: 366,181

[22] Filed: Apr. 7, 1982

[30] Foreign Application Priority Data

Aug. 4, 1981 [JP] Japan ................................ 56-121451

[51] Int. Cl.$^3$ ................................................ C08K 5/09
[52] U.S. Cl. ..................................... 524/397; 524/394; 524/398; 524/399; 524/533; 524/906; 525/310
[58] Field of Search ............... 524/394, 397, 398, 399, 524/533, 906

[56] References Cited

U.S. PATENT DOCUMENTS 3,625,875 12/1971 Framinglass et al. ............. 524/533
4,192,790 3/1980 McKinstry et al. ................ 524/397

Primary Examiner—Carman J. Seccuro
Attorney, Agent, or Firm—Jacobs & Jacobs

[57] ABSTRACT

There are provided two-part type adhesives composed of two liquid systems, exhibiting marked stabilization without impairing its adhesion property. One liquid system thereof comprises an acrylic monomer, an organic peroxide, and a metal salt of which the metal is an alkali metal, zinc or nickel; the other liquid system comprises an acrylic monomer and a curing accelerator; and at least one of the liquid systems further contains an elastomer.

6 Claims, No Drawings

TWO-PART TYPE (METH)ACRYLATE ADHESIVES HAVING EXCELLENT STORAGE STABILITIES

BACKGROUND OF THE INVENTION

This invention relates to two-part type modified-acrylic adhesives having excellent storage stabilities.

Recently, modified acrylic adhesives have been used as structural adhesives. The adhesives of this type are two-part non-mixture type systems; upon application, immediately before bonding, a primer containing a curing accelerator is coated on the surface of one adherend and a main adhesive is coated on the surface of the other adherend followed by rubbing the adherends against each other and setting them. The adhesives of this type have excellent characteristic in that they are good in workability because no mixing is required, are set in a short time at room temperature, are applicable to wide range of adherends, and provide excellent adhesion strengths. That is, such adhesives have good workability and rapid curing property comparable with conventional cyanoacrylate adhesives, and also exhibit a stronger adhesion strength than conventional epoxy adhesives. The present inventors, however, have noted that the adhesives of this type have defects in that they are inferior in storage stability to anaerobic adhesives because they contain a large amount of less anaerobic acrylic monomers and in that they are very readily gelled in the presence of an elastomer. Therefore, these adhesives often cause troubles such as increase in viscosity and gelling when stored at a high temperature, especially at 30° C. or higher for a short period of time, which has been a large obstacle in uses because of a short shelf life after shipment. This tendency is marked in the two-part systems and particularly in the system containing an organic peroxide.

For eliminating the above-mentioned defects, there have been used radical polymerization inhibitors such as hydroquinone, p-benzoquinone, hydroquinone monomethyl ether and the like. But the effects thereof are not always satisfactory. As shown in Table 10 below, the storage stability is increased when the amount of such an inhibitor added is increased, but setting time is retarded with the increase of the inhibitor, leading to decrease in the adhesion strength.

After intensive researches on two-part type modified-acrylic adhesives having good storage stabilities as well as excellent adhesion properties, the present inventors have unexpectedly found that, although such properties can not be achieved by the use of ordinary polymerizate inhibitors, the following composition according to the present invention containing a salt of certain metals exhibits marked stabilization without imparing the adhesion property. The present invention has been thus accomplished.

SUMMARY OF THE INVENTION

In accordance with the present invention, there are provided a two-part type adhesives having excellent storage stabilities which are composed of the following liquid system I and liquid system II; said liquid system I is a composition comprising as the essential components thereof an acrylic monomer, an organic peroxide, and a metal salt as a stabilizer of which the metal is selected from an alkali metal, zinc, nickel and mixtures thereof; said liquid system II is a composition comprising as the essential components thereof an acrylic monomer and a curing accelerator; at least one of the liquid systems I and II further containing an elastomer.

DETAILED DESCRIPTION OF THE INVENTION

The two-part adhesives of the present invention are used, for example, for bonding adherends such as steel sheets by coating one liquid system thereof on the bonding surface of one adherend and the other liquid system on the surface of the other adherend, and then mating the surfaces in such a way as rub against each other.

The substantial amount of the acrylic monomer to be used in the present two-part adhesives are preferably selected from polymerizable methacrylate and/or acrylate monomers; which are exemplified by an alkyl methacrylate, a hydroxyalkyl methacrylate, a polymethacrylate of a polyhydric alcohol, an epoxy polymethacrylate, a urethane polymethacrylate, a polyester polymethacrylate, and a mixed ester thereof. The acrylic monomer is used alone or in mixtures. From the viewpoint of bonding properties, especially preferred is a mixed system of an alkyl methacrylate of which the alkyl group has 1 to 3 carbon atoms and a hydroxyalkyl methacrylate of which the alkyl group has 2 to 4 carbon atoms. If desired, a suitable amount of the above-mentioned polyfunctional methacrylate can be added thereto to improve heat resistance, water resistance and the like. A very small amount of methacrylic acid or acrylic acid can also be added to improve bonding properties. Incidentally, by the term "acrylic monomer" herein is meant a polymerizable monomer having at least one acrylic or methacrylic group therein.

Organic peroxide to be used include, for example, hydroperoxides such as t-butylhydroperoxide, p-menthane hydroperoxide, cumene hydroperoxide and diisopropylbenzene hydroperoxide; dialkyl peroxides such as di-t-butylperoxide 2,5-dimethyl-2,5-di(t-butylperoxy)hexane, and dicumyl peroxide; diacylperoxides such as lauroyl peroxide and benzoyl peroxide; and ketone peroxides such as methyl ethyl ketone peroxide.

The metal salts used as a stabilizer in which the metal is selected from alkali metals, zinc and nickel may be inorganic or organic metal salts. The organic metal salts can exhibit a larger effect and, for example, are represented by acetates, acrylates and methacrylates of the metals. The metal salt can be used alone or in mixtures. These metal salts are present in the liquid system I preferably in the form of solution, but may also be present in the form of suspension. The amount of the metal salt to be added is about 0.01 to about 20% and preferably about 0.1 to about 10% by weight of the liquid system I. When the amount is less than 0.01%, the resulting storage-stabilization effect is smaller. If the amount is over 20%, handling becomes inconvenient because of a larger amount of the resulting insoluble matters.

The liquid system II comprises as essential components a curing accelerator and also acrylic monomer which may be the same type as in the liquid system I. As the curing accelerator can be used those known compounds which are able to decompose organic peroxides via the so-called redox reaction. These compounds are represented by metal chelate compounds such as vanadyl acetyl acetonate and cobalt acetyl acetonate; metal soaps such as manganese naphthenate and cobalt naphthenate; and sulfur-containing compounds such as dibutyl thiourea and ethylene thiourea, as described in E. Takiyama, "Polyester Resin," pages 86–87, published by Nikkan Kogyo Shinbunsha, Japan. These curing accelerators can be used alone or in mixtures. The amount of the accelerator to be added is about 0.01 to 20, preferably 0.05 to 10% by weight. Because the liquid system II contains no organic peroxide, it has better stability than the liquid system I. However, the liquid system II can be further stabilized if so desired by the addition thereto of the metal salts to be used in the liquid system I, or other metal salts in which the metal is selected from alkali earth metals, aluminium and heavy metals such as iron, copper, chromium and manganese. Although heavy metal salts are generally known as a curing accelerator used at a low temperature, the salts act as a stabilizer in the liquid system II containing no organic peroxide, and also act as a curing accelerator when contacted with the liquid system I in a bonding operation. These salts may be either inorganic or organic salts, and are exemplified by chlorides, acetates, acrylates and methacrylates. These salts can be used alone or in mixtures. These metal salts are present in the liquid system II preferably in the form of solution, but may also be present in the form of suspension. The amount of the above-described metal salt to be added is about 0.01 to 10% and preferably about 0.1 to about 5% by weight of the liquid system II. When the amount is less than 0.01%, the resulting storage-stabilization effect is smaller. If the amount is over 10%, handling becomes inconvenient because of a larger amount of the resulting insoluble matters.

The two-part adhesive of the present invention should contain an elastomer in at least one of the above-mentioned liquid systems I and II.

The elastomer involves a synthetic rubber, a natural rubber and mixtures thereof, and is to give an excellent bonding property via a chemical reaction (especially graft-polymerization) with the above-mentioned acrylic monomer. These elastomers include, for example, styrene butadiene rubber (SBR), polybutadiene rubber (BR), polyisoprene rubber (IR), chloroprene rubber (CR), nitrile rubber (NBR) and the like. Incidentally, the degree of polymerization of the elastomer is within such a range that the elastomer is substantially in a solid state and also is dissolved or finely dispersed in the acrylic monomers. In view of high polarity, good solubility in the acrylic monomer and the resulting good adhesion, nitrile rubber (NBR) is especially preferred. The amount to be added is generally in the range of about 5% to about 50% by weight of the liquid system.

In some cases, the adhesive (i.e., the liquid systems I and II) of the present invention may be further stabilized by using a radical polymerization inhibitor concomitantly with the above-mentioned metal salt used as stabilizer in the present invention. Moreover, a small amount (0.5% by weight or less) of paraffin wax can be added to the liquid system for the purpose of enhancing the surface-hardening property of the adhesive. If desired, it is also possible to add a plasticizer, a filler, a viscosity modifier, an antioxidant, a pigment and the like. As described above, the two-part adhesive of the present invention which contains the metal salt as an essential component possesses far higher storage stability in comparison with conventional adhesives which do not contain such metal salts, and have no adverse effect on the setting time thereof and the like, whereby the defects in the conventional adhesives of this type have been eliminated.

The present invention is further explained by way of the following examples and comparative examples, wherein all "parts" are by weight unless otherwise specified.

REFERENCE EXAMPLES 1 AND 2

Preparation of base material solutions for adhesives

Homogeneous base material solutions for adhesives having the following compositions were prepared at room temperature.

| Ref. Ex. 1 | Ref. Ex. 2 |
|---|---|
| MMA 600 parts | MMA 600 parts |
| HEMA 200 parts | HPM 120 parts |
| NBR 100 parts | CR 80 parts |
|  | HQ 0.24 part |

Note;
MMA: methyl methacrylate
HEMA: 2-hydroxyethyl methacrylate
NBR: Nitrile rubber NIPOL 1042 from Japanese Geon Co., Ltd.
HPM: 2-hydroxypropyl methacrylate
CR: Chloroprene rubber Y-30 from Toyo Soda K.K., Japan
HQ: hydroquinone

EXAMPLE 1

The liquid system I and liquid system II of the present invention were prepared according to the following formulations, respectively.

| Liquid system I | | Liquid system II | |
|---|---|---|---|
| Base material solution obtained in Ref. Ex. 1 | 45 parts | Base material solution obtained in Ref. Ex. 1 | 45 parts |
| Cumene hydroperoxide | 1 part | Vanadyl acetyl acetonate | 0.25 part |
| HEMA solution saturated with the metal salt shown in Table 1 | 5 parts | HEMA solution saturated with the metal salt shown in Table 2 | 5 parts |

The storage stabilities at 50° C. were tested as to the liquid systems I and II prepared above. The results are shown in Tables 1 and 2. The storage stability was measured in accordance with the following testing method.

Test on storage stability at 50° C.:

Fifty (50) ml of a liquid system was put in a 100 ml polyethylene container and placed in a dryer at 50° C., and the time required until the liquid system was gelled was measured.

TABLE 1

| | | Storage stability of the liquid system I at 50° C. | | |
|---|---|---|---|---|
| Sample No. | Example or comparative example | Type of metal salts | Concentration of the metal salt in a saturated HEMA solution (% by weight) | Time required for gelation at 50° C. |
| 1 | Ex. | lithium acetate | 0.22 | 1 day |
| 2 | Ex. | sodium acetate | 0.77 | 2 days |
| 3 | Ex. | potassium acetate | 10$^{(1)}$ | 5 days |
| 4 | Ex. | zinc acetate | 3.23 | 2 days |
| 5 | Ex. | nickel acetate | 5.16 | 1 day |
| 6 | Ex. | potassium methacrylate | 4.36 | 4 days |
| 7 | Ex. | zinc methacrylate | 6.44 | 15 days |
| 8 | Ex. | zinc acrylate | 4.58 | 8 days |
| 9 | Comp. Ex. | magnesium acetate | 10$^{(1)}$ | 2 hrs. |
| 10 | Comp. Ex. | calcium acetate | 0.33 | 1 hr. |
| 11 | Comp. Ex. | barium acetate | 0.88 | 1 hr. |
| 12 | Comp. Ex. | iron acetate | 7.22 | 1 hr. |
| 13 | Comp. Ex. | cobalt acetate | 3.02 | 2 hrs. |
| 14 | Comp. Ex. | copper acetate | 4.96 | 0.5 hr. |

TABLE 1-continued

Storage stability of the liquid system I at 50° C.

| Sample No. | Example or comparative example | Type of metal salts | Concentration of the metal salt in a saturated HEMA solution (% by weight) | Time required for gelation at 50° C. |
|---|---|---|---|---|
| 15 | Comp. Ex. | chromium acetate | 10[(1)] | 2 hrs. |
| 16 | Comp. Ex. | aluminum acetate | 2.28 | 2 hrs. |
| 17 | Comp. Ex. | manganese acetate | 3.85 | 1 hr. |
| 18 | Comp. Ex. | magnesium methacrylate | 6.74 | 4 hrs. |
| 19 | Comp. Ex. | methacrylic acid | 10[(1)] | 2 hrs. |
| 20 | Comp. Ex. | (not added) | — | 1 hr. |

Note:
[(1)]The concentration was estimated to be 10%, although the solubility is more 10%.

As clearly shown in Table 1 above, the storage stability of the liquid system I incorporated with the metal salt defined according to the present invention is far superior to the liquid system containing other metal salts, methacrylic acid or no salt.

TABLE 2

Storage stability of the liquid system II at 50° C.

| Sample No. | Type of metal salts | Time required for gelation at 50° C. (day) |
|---|---|---|
| 1' | sodium acetate | 7 |
| 2' | magnesium acetate | 7 |
| 3' | zinc acetate | 6 |
| 4' | nickel acetate | 7 |
| 5' | iron acetate | 13 |
| 6' | copper acetate | 18 |
| 7' | chromium acetate | 18 |
| 8' | cobalt acetate | 3 |
| 9' | potassium methacrylate | 7 |
| 10' | magnesium methacrylate | 10 |
| 11' | methacrylate acid | 4 |
| 12' | (not added) | 4 |

As clearly shown in Table 2, the storage stability of the liquid system II is good even when no salt is added. The stability, however, is enhanced by the addition of certain types of metal salts.

EXAMPLE 2

To each of the liquid systems I of sample Nos. 2, 3, 4, 5, 6, 7 and 8 and the liquid system II of sample No. 10' was added 0.3% each (based on the weight of the base material solution) of paraffin wax. The properties of the resulting systems were measured in accordance with the following testing methods. The results are shown in Table 3.

A. Measurement of bonding strength

Tensile shear strength: ASTM D1002-64; Adherend, cold-rolled steel sheet 1.6 mm thick.

Impact strength: ASTM D950-54; Adherend, rolled steel for general structure.

Surface treatment of adherend: sanded with No. 240 sand paper and then defatted with trichloroethylene.

Temperature and humidity at measurement: 23° C., 50% RH

Bonding time: 24 hours.

B. Measurement of setting time

Two test pieces for tensile shear strength were sanded with No. 240 sand paper and then defatted with trichloroethylene. One test piece was coated with a liquid system I and the other piece with a liquid system II. The coated surfaces of the test pieces were mated in such a way as rub against each other. The time required until the laminated test pieces could not be torn off by the hands was measured as the setting time.

TABLE 3

| | | | Properties measured by the tests | | |
|---|---|---|---|---|---|
| Sample No. of the liquid system I | Sample No. of the liquid system II | Type of the metal salt in the liquid system I | Tensile shear strength (Kg/cm$^2$) | Impact strength (Kg-cm/ cm$^2$) | Setting time (minute) |
| 2 | 10' | sodium acetate | 229 | 22.5 | 7 |
| 3 | " | potassium acetate | 219 | 24.3 | 8 |
| 4 | " | zinc acetate | 179 | 23.5 | 9 |
| 5 | " | nickel acetate | 152 | 33.2 | 8 |
| 6 | " | potassium methacrylate | 159 | 29.5 | 8 |
| 7 | " | zinc methacrylate | 152 | 31.8 | 9 |
| 8 | " | zinc acrylate | 263 | 34.5 | 8 |

EXAMPLE 3

The following liquid systems I and II were prepared.

| Liquid system I | | Liquid system II | |
|---|---|---|---|
| Base material solution obtained in Ref. Ex. 1 | 45 parts | Base material solution obtained in Ref. Ex. 1 | 45 parts |
| Cumene hydroperoxide | 1 part | Ethylene thiourea | 0.5 part |
| HEMA solution saturated with zinc methacrylate (the amount of addition being shown in Table 4) | | HEMA solution saturated with the metal salt shown in Table 5 | 5 parts |

The storage stabilities at 50° C. were tested as to the above-mentioned liquid systems I and II. The results are shown in Tables 4 and 5.

TABLE 4

Storage stability of the liquid system I at 50° C.

| Sample No. | Amount of zinc methacrylate (part) added to the saturated HEMA solution | Gelation time at 50° C. |
|---|---|---|
| 21 | 0.01 | 2 hrs |
| 22 | 0.05 | 2 days |
| 23 | 0.1 | 6 days |
| 24 | 0.2 | 9 days |
| 25 | 1.0 | over 30 days |
| 26 | 2.0 | over 30 days |

From Table 4, it is clearly shown that the storage stability of the liquid system I is markedly enhanced as the amount of zinc methacrylate added is increased.

TABLE 5

Storage stability of the liquid system II at 50° C.

| Sample No. | Type of the metal salt added | Gelation time at 50° C. (day) |
|---|---|---|
| 13' | lithium acetate | over 20 days |
| 14' | calcium acetate | over 20 days |
| 15' | barium acetate | over 20 days |
| 16' | zinc acetate | over 20 days |
| 17' | aluminum acetate | over 20 days |
| 18' | manganese acetate | over 20 days |

TABLE 5-continued

Storage stability of the liquid system II at 50° C.

| Sample No. | Type of the metal salt added | Gelation time at 50° C. (day) |
|---|---|---|
| 19' | cobalt acetate | 8 days |
| 20' | magnesium methacrylate | over 20 days |
| 21' | zinc methacrylate | over 20 days |
| 22' | (not added) | 11 days |

As clearly shown in Table 5, storage stability of the liquid system II is good even in the absence of the metal salt. The storage stability is further enhanced by the addition of certain metal salts.

EXAMPLE 4

To each of the liquid system I of sample No. 7 in Example 1, the liquid system I of sample Nos. 23, 24, 25 and 26 in Example 3, and the liquid system II of sample No. 20' in Example 3, is added 0.3% by weight each of paraffin wax. The properties of the resulting adhesives were measured. The results are shown in the following Table 6.

TABLE 6

Physical Properties of the adhesives

| Nos. of the liquid system I | Nos. of the liquid system II | Amount (part) of zinc methacrylate in a saturated HEMA solution | Tensile shear strength (Kg/cm²) | Impact strength (Kg-cm/cm²) | Setting time (minute) |
|---|---|---|---|---|---|
| 7 | 20' | 0.1 | 167 | 25.9 | 8 |
| 23 | " | 0.2 | 153 | 15.6 | 9 |
| 24 | " | 0.5 | 146 | 24.3 | 9 |
| 25 | " | 1.0 | 149 | 16.7 | 10 |
| 26 | " | 2.0 | 138 | 14.8 | 12 |

EXAMPLE 5

The liquid systems I and II having the following compositions were prepared.

| Liquid system I | | Liquid system II | |
|---|---|---|---|
| Base material solution obtained in Ref. Ex. 2 | 45 parts | Base material solution obtained in Ref. Ex. 2 | 45 parts |
| Cumene hydroperoxide | 1 part | Dibutyl thiourea | 0.24 part |
| HEMA solution saturated with the metal salts shown in Table 7 | 3 parts | Manganese naphthenate | 0.048 part |
| | | HEMA solution saturated with the metal salts shown in Table 8 | 3 parts |

The storage stabilities at 50° C. of the above-described liquid systems I and II were tested. The results are shown in Table 7 and Table 8.

TABLE 7

Storage stability at 50° C. of the liquid system I

| Sample Nos. | Example or Comp. Example | Types of metal salts | Gelation time at 50° C. |
|---|---|---|---|
| 27 | Ex. | sodium acetate | 1 day |
| 28 | Ex. | potassium acetate | 3 days |
| 29 | Ex. | zinc methacrylate | 4 days |
| 30 | Comp. Ex. | copper acetate | 0.5 hour |
| 31 | Comp. Ex. | iron acetate | 1 hour |
| 32 | Comp. Ex. | manganese acetate | 1 hour |
| 33 | Comp. Ex. | methacrylic acid | 1 hour |
| 34 | Comp. Ex. | (not added) | 10 hours |

As clearly shown in Table 7, the storage stability of the liquid system I incorporated with the metal salt defined according to the present invention is better than the liquid system containing other metal salts, methacrylic acid or no salt.

TABLE 8

Storage stability at 50° C. of the liquid system II

| Sample Nos. | Type of metal salts | Gelation time at 50° C. (days) |
|---|---|---|
| 23' | sodium acetate | 5 |
| 24' | potassium acetate | 5 |
| 25' | potassium methacrylate | 8 |
| 26' | magnesium methacrylate | 5 |
| 27' | zinc methacrylate | 5 |
| 28' | (not added) | 3 |

As clearly shown in Table 8, storage stability of the liquid system II is good even in the absence of the metal salt. The storage stability, however, is further enhanced by the addition of certain metal salts.

Moreover, the setting times of the two-part adhesives composed of the combination of the liquid system I of sample No. 28 and the system II of sample No. 24' as well as the combination of the system I of sample No. 29 and the system II of sample No. 27' were measured to be 7 minutes and 9 minutes, respectively. Both the two-part adhesives were found to be excellent in rapid-setting property.

EXAMPLE 6

The liquid systems I consisting of 45 parts of base material solution shown in Ref. Example 1, 5 parts of HEMA solution saturated with zinc methacrylate and 1 part of various organic peroxides shown in the following Table 9 were prepared. The storage stabilities at 50° C. of the liquid systems I were checked. The results are shown in Table 9.

TABLE 9

Storage stability at 50° C. of liquid system I

| | Gelation time at 50° C. | |
|---|---|---|
| Type of organic peroxides | Examples (zinc methacrylated added) | Comparative Examples (not added) |
| t-butyl hydroperoxide | 8 days | 16 hrs. |
| diisopropylbenzene hydroperoxide | 18 days | 1 hour |
| dicumyl peroxide | 14 days | 4 days |
| 2,5-dimethyl-2,5-di(t-butylperoxy)hexane | 15 days | 3 days |
| p-methane hydroperoxide | 18 days | 2 hrs. |
| methyl ethyl ketone peroxide | 14 days | 5 hrs. |

As clearly shown in Table 9, the storage stability of the liquid system containing zinc methacrylate together with the various organic peroxides is far superior to that of the corresponding system containing no zinc methacrylate.

COMPARATIVE EXAMPLE 1

The liquid systems I consisting of 45 parts of base material solution shown in Ref. Example 1, 1 part of cumene hydroperoxide, 0.135 part of paraffin wax and various amounts (as shown in the following Table 10) of hydroquinone monomethyl ether (hereinafter referred to as HQME) were prepared. The storage stabilities thereof at 50° C. were measured. Separately, the liquid system II of sample No. 9' shown in Table 2 of Example 2 was incorporated with 0.3% by weight of paraffin wax based on the weight of the base material solution thereof. The properties of the adhesives composed of the liquid system I and the liquid system II were measured. The results are shown in Table 10.

TABLE 10

Storage stability of the liquid system I, and properties of the adhesive

| Amount of HQME added, % by weight | Gelation time of liquid system I at 50° C. | Tensile shear strength (Kg/cm$^2$) | Impact strength (Kg-cm/cm$^2$) | Setting time (minute) |
| --- | --- | --- | --- | --- |
| 1.0 | 5 hrs. | 210 | 24.1 | 12 |
| 2.0 | 16 hrs. | 206 | 18.9 | 21 |
| 3.0 | 2 days | 206 | 17.5 | 27 |
| 4.0 | 5 days | 175 | 15.8 | 35 |
| 5.0 | 10 days | 113 | 12.9 | 83 |

As clearly shown from Table 10, when the amount of HQME added is smaller, the setting time is shorter but the storage stability becomes worse; whereas when the amount of HQME is larger, the storage stability is enhanced but the setting time is delayed. The rapid-setting property which is one of the characteristics of two-type modified-acrylic adhesives is thus impaired. Also the adhesion strengths are generally lowered as the amount of HQME is increased.

What is claimed is:

1. Two-part type adhesives having excellent storage stabilities, which are composed of the following liquid system I and liquid system II; said liquid system I is a composition comprising as the essential components thereof an acrylic monomer selected from the group consisting of a polymerizable methacrylate monomer, a polymerizable acrylate monomer, or mixtures thereof, an organic peroxide, and a metal salt as a stabilizer of which the metal is selected from an alkali metal, zinc, nickel and mixtures thereof; said liquid system II is a composition comprising as the essential components thereof an acrylic monomer selected from the group consisting of a polymerizable methacrylate monomer, a polymerizable acrylate monomer, or mixtures thereof and a curing accelerator; at least one of the liquid systems I and II further containing an elastomer.

2. The adhesives according to claim 1, in which the acrylic monomer used at least in the liquid system I is a mixture of an alkyl methacrylate of which the alkyl group has 1 to 3 carbon atoms and a hydroxyalkyl methacrylate of which the alkyl group has 2 to 4 carbon atoms.

3. The adhesives according to any one of claims 1 or 2, in which the metal salt used as a stabilizer is an acetate, an acrylate and/or a methacrylate, the metal being selected from an alkali metal, zinc, nickel and mixtures thereof.

4. The adhesives according to any one of claims 1 or 3, in which the amount of the metal salt stabilizer used in the liquid system I is about 0.1 to about 10% by weight of the liquid system I.

5. The adhesives according to claim 1, in which the elastomer is selected from styrene-butadiene rubber, polybutadiene rubber, polyisoprene rubber, chloroprene rubber, and nitrile rubber.

6. The adhesives according to claim 1, in which nitrile rubber is used as the elastomer in an amount of about 5% to about 50% by weight of the liquid system I or II.

* * * * *